(12) United States Patent
Barsness et al.

(10) Patent No.: US 8,135,703 B2
(45) Date of Patent: Mar. 13, 2012

(54) MULTI-PARTITION QUERY GOVERNOR IN A COMPUTER DATABASE SYSTEM

(75) Inventors: Eric Lawrence Barsness, Pine Island, MN (US); Robert Joseph Bestgen, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/892,919

(22) Filed: Sep. 28, 2010

(65) Prior Publication Data

US 2011/0022585 A1 Jan. 27, 2011

Related U.S. Application Data

(62) Division of application No. 11/566,781, filed on Dec. 5, 2006, now Pat. No. 7,853,584.

(51) Int. Cl.
*G06F 7/00* (2006.01)
*G06F 17/30* (2006.01)
*G06F 3/00* (2006.01)

(52) U.S. Cl. .................. 707/719; 707/759; 715/738

(58) Field of Classification Search ........... 707/999.002, 707/999.003, 714; 718/104; 715/738
See application file for complete search history.

(56) References Cited

U.S. PATENT DOCUMENTS

| | | | |
|---|---|---|---|
| 4,769,772 A * | 9/1988 | Dwyer | 707/714 |
| 5,325,525 A | 6/1994 | Shan et al. | |
| 5,446,886 A | 8/1995 | Li | |
| 5,819,255 A * | 10/1998 | Celis et al. | 1/1 |
| 5,826,269 A | 10/1998 | Hussey | |
| 6,021,405 A | 2/2000 | Celis et al. | |
| 6,363,371 B1 * | 3/2002 | Chaudhuri et al. | 1/1 |
| 6,405,198 B1 | 6/2002 | Bitar et al. | |
| 7,574,424 B2 * | 8/2009 | Chowdhuri | 1/1 |
| 2004/0143571 A1 | 7/2004 | Bjornson et al. | |
| 2004/0167873 A1 * | 8/2004 | Dettinger et al. | 707/2 |
| 2005/0060285 A1 * | 3/2005 | Barsness et al. | 707/2 |
| 2005/0097099 A1 | 5/2005 | Kapoor et al. | |
| 2005/0192937 A1 * | 9/2005 | Barsness et al. | 707/3 |
| 2005/0192951 A1 * | 9/2005 | Day et al. | 707/3 |
| 2005/0262045 A1 * | 11/2005 | Tsuchida et al. | 707/2 |
| 2005/0289098 A1 * | 12/2005 | Barsness et al. | 707/1 |
| 2006/0080285 A1 * | 4/2006 | Chowdhuri | 707/3 |
| 2006/0155915 A1 * | 7/2006 | Pereira | 711/100 |

* cited by examiner

*Primary Examiner* — Mohammad Ali
*Assistant Examiner* — Bao Tran
(74) *Attorney, Agent, or Firm* — Martin & Associates LLC; Bret J. Petersen

(57) ABSTRACT

An apparatus and method for a multi-partition query governor in a partitioned computer database system. In preferred embodiments a query governor uses data of a query governor file that is associated with multiple partitions to determine how the query governor manages access to the database across multiple partitions. Also, in preferred embodiments, the query governor in a local partition that receives a query request communicates with a query governor in a target partition to accumulate the total resource demands of the query on the local and target partitions. In preferred embodiments, a query governor estimates whether resources to execute a query will exceed a threshold over all or a combination of database partitions.

8 Claims, 6 Drawing Sheets

MULTI-PARTITION QUERY GOVERNOR IN A COMPUTER DATABASE SYSTEM

CROSS-REFERENCE TO PARENT APPLICATION

This patent application is a continuation of a U.S. patent application of the same title, Ser. No. 11/566,781, filed on Dec. 5, 2006, which is incorporated herein by reference.

BACKGROUND OF THE INVENTION

1. Technical Field

This invention generally relates to query governors in a computer database system, and more specifically relates to a database query governor for a multi-partition computer database system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Optimization and execution of a database query can be a resource-intensive and time-consuming process. Further, the larger the database, the longer the time needed to execute the query. In order to prevent an excessive drain on resources, many databases are configured with query governors. A query governor prevents the execution of large and resource-intensive queries by referencing a defined threshold. If the cost of executing a query exceeds the threshold, the query is not executed. The query governor has a configuration file that determines the databases that an instance of the governor monitors and how it manages it.

Many large institutional computer users are experiencing tremendous growth of their databases. One of the primary means of dealing with large databases is that of distributing the data across multiple partitions. The partitions can be logical or physical over which the data is distributed. Prior art query governors have limited features when used in multiple partitions. Each partition has a query governor configuration file that determines how the query governor behaves for a given partition.

On partitioned computer systems in the prior art, the query governor is not able to effectively control the total use of resources across all the partitions. Without a way to more effectively govern queries in a partitioned environment, computer systems managers will continue to have inadequate control over database queries and their use of system resources.

DISCLOSURE OF INVENTION

According to the preferred embodiments, an apparatus and method is described for a multi-partition query governor in partitioned databases. In preferred embodiments a query governor file is provided that is associated with multiple partitions and determines how the query governor manages the database that is divided into multiple partitions. Also, in preferred embodiments, the query governor in a local partition that receives a query request communicates with a query governor in a target partition to accumulate the total resource demands of the query on the local and target partitions. In preferred embodiments, a query governor estimates whether resources to execute a query will exceed a threshold over all or a combination of database partitions.

The disclosed embodiments are directed to a generic computer architecture and could be implemented on any computer system with multiple partitions.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

Figure 1:
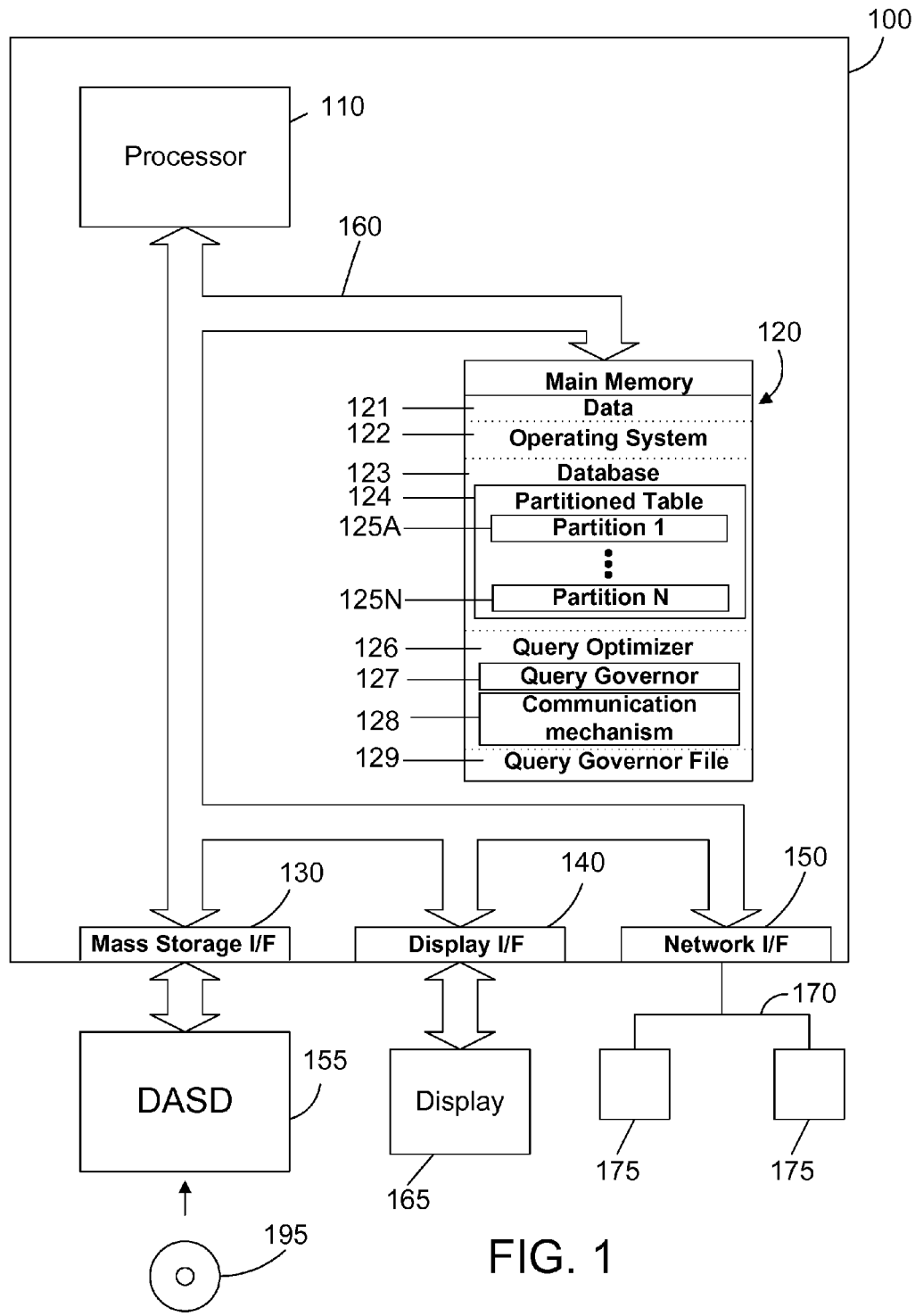
FIG. 1 is a block diagram of a computer system according to preferred embodiments.

The present invention relates to query governors that govern the access of database queries to partitioned database tables. For those not familiar with databases, queries, partitioned database tables or query governors, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces a mini access plan to execute the query in the database. The mini-plan may be stored in a mini-plan cache for use with subsequent queries that use the same mini-plan. In the prior art, a tool known as a query optimizer evaluates expressions in a query and optimizes the query and the access plan to access the database.

Known Partitioned Database Tables

A partitioned database table is divided into multiple discrete portions referred to as partitions. Each entry in the table is allocated to a respective one of the partitions. A partition is usually a discrete data entry, such as a file, but contains the same definitional structure as all other partitions of the same table. Partitioning may be performed for a variety of reasons, and is usually performed on very large tables as a way to break the data into subsets of some conveniently workable size. By dividing a table into partitions, improved execution efficiency can result by working with a smaller subset of the table instead of the whole table.

Known Query Governors for Partitioned Database Tables

As introduced above, partitioned databases are sometimes configured with query governors to prevent an excessive drain on resources. A query governor prevents the execution of large and resource intensive queries by referencing a defined threshold. If the cost of executing a query exceeds the threshold, the query is not executed. The query governor is sometimes implemented as part of the query optimizer as described below with reference to preferred embodiments herein. The query governor has a configuration file that determines the databases that an instance of the governor monitors and how the governor manages the database.

Figure 2:
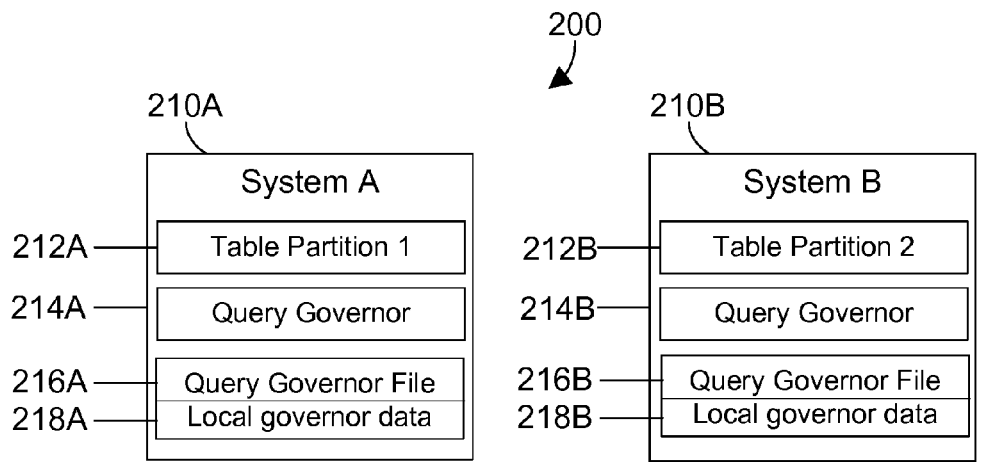
FIG. 2 is a block diagram of a partitioned query governor system according to the prior art.

FIG. 2 illustrates a query governor file for a sample partitioned database according to the prior art. Each system 210A, 210B has one or more partitions of a database 212A, 212B. Each system has a query governor 214A, 214B that has a query governor file 216A, 216B. Each query governor file 216A, 216B contains local governor data 218A, 218B that indicates how to manage the query governor for that partition 212A, 212B. This prior art setup does not provide a way to implement governor management options over the combination of partitions. The query governor operates independently for each partition and the query governor file includes query governor information for only the local partition.

2.0 Detailed Description

A query governor file is provided that spans across multiple database partitions so that one or more query governors (in the query optimizers) can control the totality of resources in the database. Further, the query governors located on separate systems communicate estimated resource costs for executing queries to other query governors located on other systems. In this way, controls can be set up for the query to control the overall amount of system resources, such as CPU time, used by all the partitions or some combination of partitions to execute a query.

Referring to FIG. 1, a computer system 100 is one suitable implementation of an apparatus in accordance with the preferred embodiments of the invention. Computer system 100 is an IBM eServer System i computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, a database 123, a query optimizer 126 and a query governor file 129. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database that includes tables, whether currently known or developed in the future. Database 123 preferably includes a partitioned table 124 that is spread over multiple partitions, shown in FIG. 1 as partitions 125A, . . . , 125N.

Figure 3:
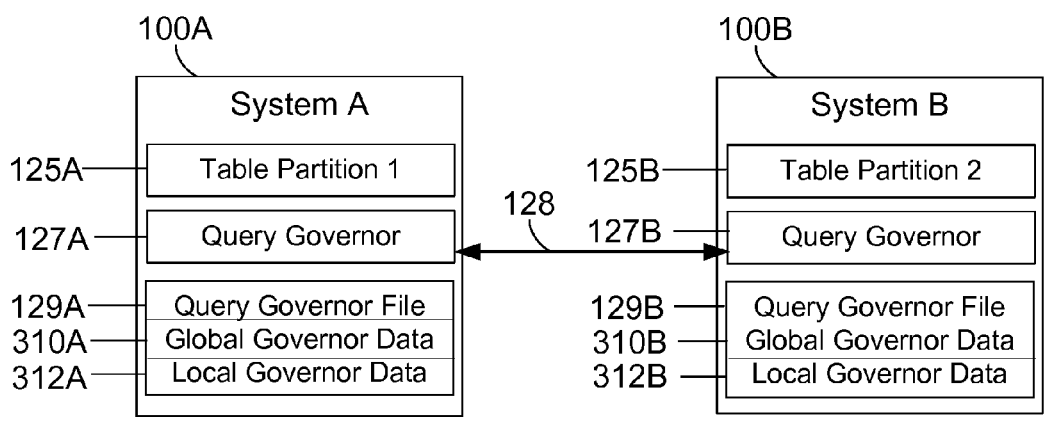
FIG. 3 is a block diagram representing a partitioned query governor system according to preferred embodiments.

The partitioned table 124 is preferably a prior art partitioned table, but could be any form of database table that is divided into separate portions. While all the partitions of the partitioned table 124 are shown to reside in the computer system 100, it should be understood that some of the partitions actually reside on other computer systems and only links or access information is located on the local computer system 100. This is illustrated by in FIG. 1 where Partition 1, located in the local system partition, is shown with a normal background, while Partition N, located in a remote partition, is shown with a darkened background. A query optimizer 126 is used to execute queries to the database 123. Note that query optimizer 126 is shown separate from database 123, but could also be implemented in database 123 within the scope of the preferred embodiments. The query optimizer 126 has a query governor 127 that governs access to the data in the partitioned table 124. The query optimizer 126 includes a communication mechanism 128 that enables communication between the query governor 127 on the local computer system 100 and query governors on other computer systems as described further below. The query governor file 129 holds information to govern access to information in the local partition 125A of the partitioned table 124 of the database 123. A query governor file 129 further includes global governor data that holds information to govern access to data across all the partitions 125 in the database 123, as shown in FIG. 3 and discussed below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query optimizer 126, and query governor file 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable media used to actually carry out the distribution. Examples of suitable computer-readable media include: recordable media such as floppy disks and CD-RW (e.g., 195 of FIG. 1), and transmission media such as digital and analog communications links.

The example of the invention described herein below is in the context of two computer systems. Other embodiments could be multiple computer systems in a partitioned computer system, in addition to having a partitioned computer database table. For simplicity, the computer system described herein is two non-partitioned computer systems. Further, the described example of the preferred embodiments reflects a query governor that checks the estimated costs to execute the entire query prior to starting the execution of the query in order to avoid wasting system resources. However, the claimed embodiments expressly include the query governor checking resource costs while executing the query using the same basic methods described herein. As used herein, the term partition can refer to a physical or logical partition. The governor data file can include thresholds that take into account whether the partition is a physical or logical partition.

FIG. 3 illustrates a partitioned database table used with a query governor according to preferred embodiments herein. Each system 100A, and 100B represent a computer system as shown in FIG. 1 that is connected as is known in the prior art. Each system 100A, 100B has one or more partitions of the partitioned table 124 of the database 123. Each partition has a corresponding query governor 127 and a query governor file 129 that operates similar to the prior art except as noted herein. In the preferred embodiments, the query governor file 129 includes global governor data 310 that indicates how to manage the query governor for the database stored across multiple, or all, the partitions of the partitioned table 124. In other embodiments, the global governor data is used in conjunction with local governor data that pertains to the local partition in the manner known in the prior art.

The query governor file may contain both local governor data and global governor data. The global governor data includes file entries that instruct the query governor to check on the total cost to execute the query with respect to all the partitions or some subset of partitions that are being considered. These global governor thresholds are checked at the initiator partition (the one that received the query request and is farming it out to the other partitions) as described below with reference to FIG. 5, step 530. Examples of global governor data include the following global governor thresholds:

TOTAL_RUNTIME_THRESHOLD—value in seconds
TOTAL_TEMPORARY_STORAGE_THRESHOLD—value in megabytes
DASD_(hard drive)_ACTIVITY—value in megabytes
CPU-CYCLES—value in cycles The query governor file may also contain local governor data that specifies non-total thresholds that are a per-partition (local partition) check that operate in the manner of the prior art. These would be checked as described below with reference to FIG. 4, step 450 and FIG. 7 step 760. Note each partition could have a different threshold. Examples of non-total or local governor thresholds include the following:

RUNTIME_THRESHOLD—value in seconds
TEMPORARY_STORAGE_THRESHOLD—value in megabytes
DASD_(hard drive)_ACTIVITY—value in megabytes
CPU-CYCLES—value in cycles Another feature of preferred embodiments is a communication mechanism 128 that provides communication from the query governor 127 of system 100A to other query governors in the partitioned database system. In FIG. 3, the communication mechanism 128 is illustrated to connect the query governor 127A in system 100A to the query governor 127B in system 100B. The communication mechanism preferably 128 uses the network connection 170 (FIG. 1) or any other hardware communications link to communicate between the query governors in the manner described further below.

Figure 4:
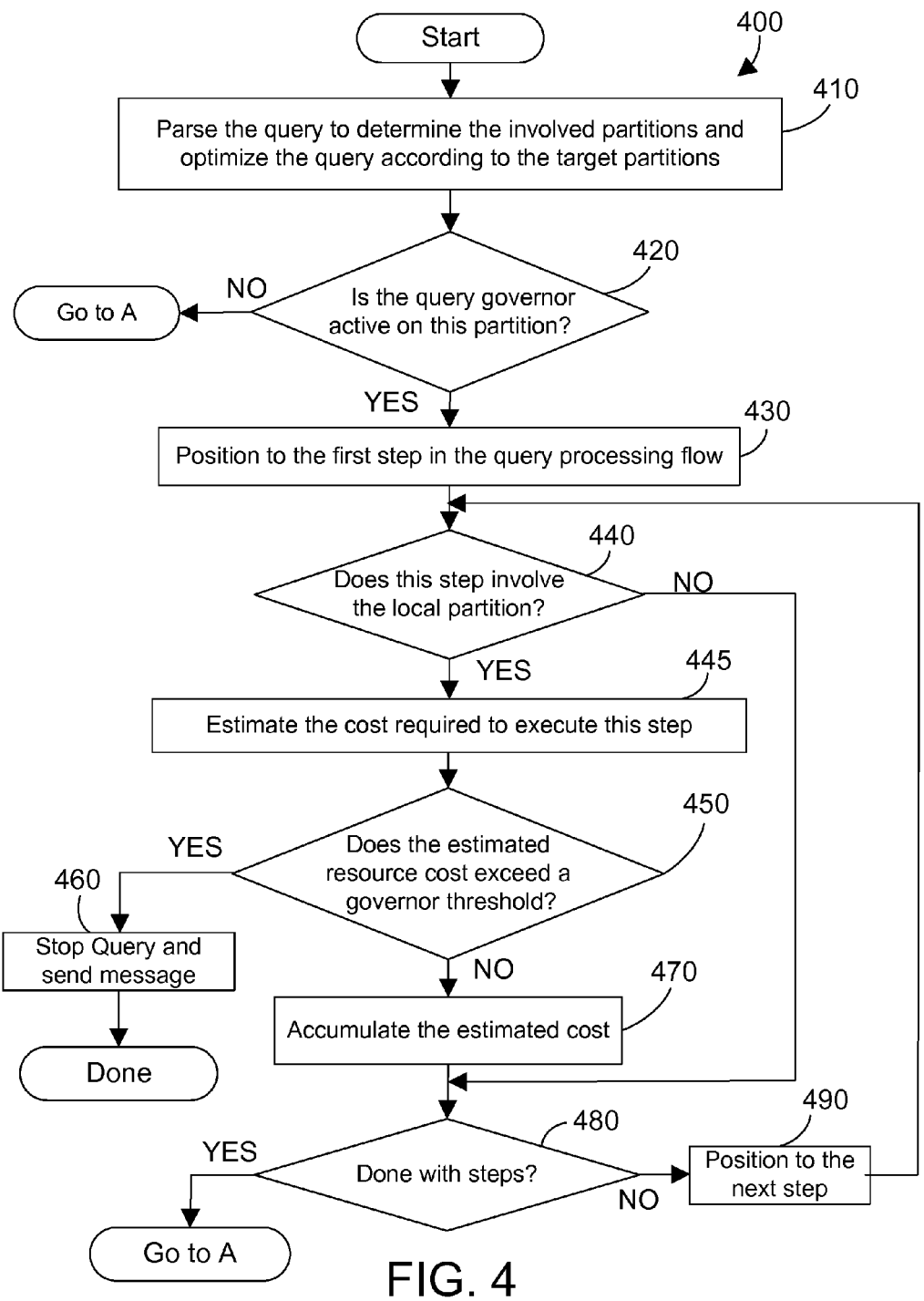
FIG. 4 is a method flow diagram for a query governor in a partitioned database according to a preferred embodiment.
Figure 5:
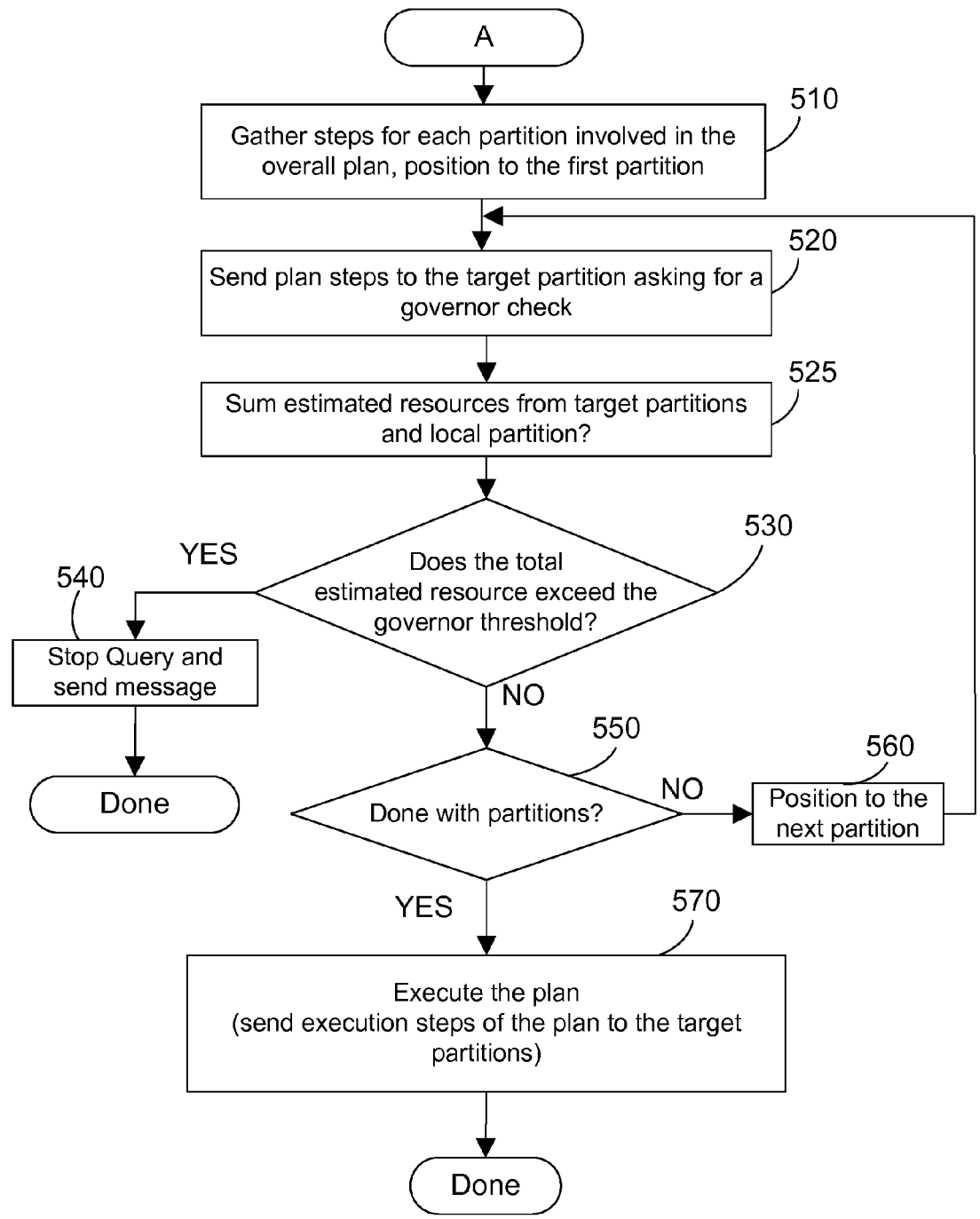
FIG. 5 is a continuation of the method flow diagram shown in FIG. 4.
Figure 6:
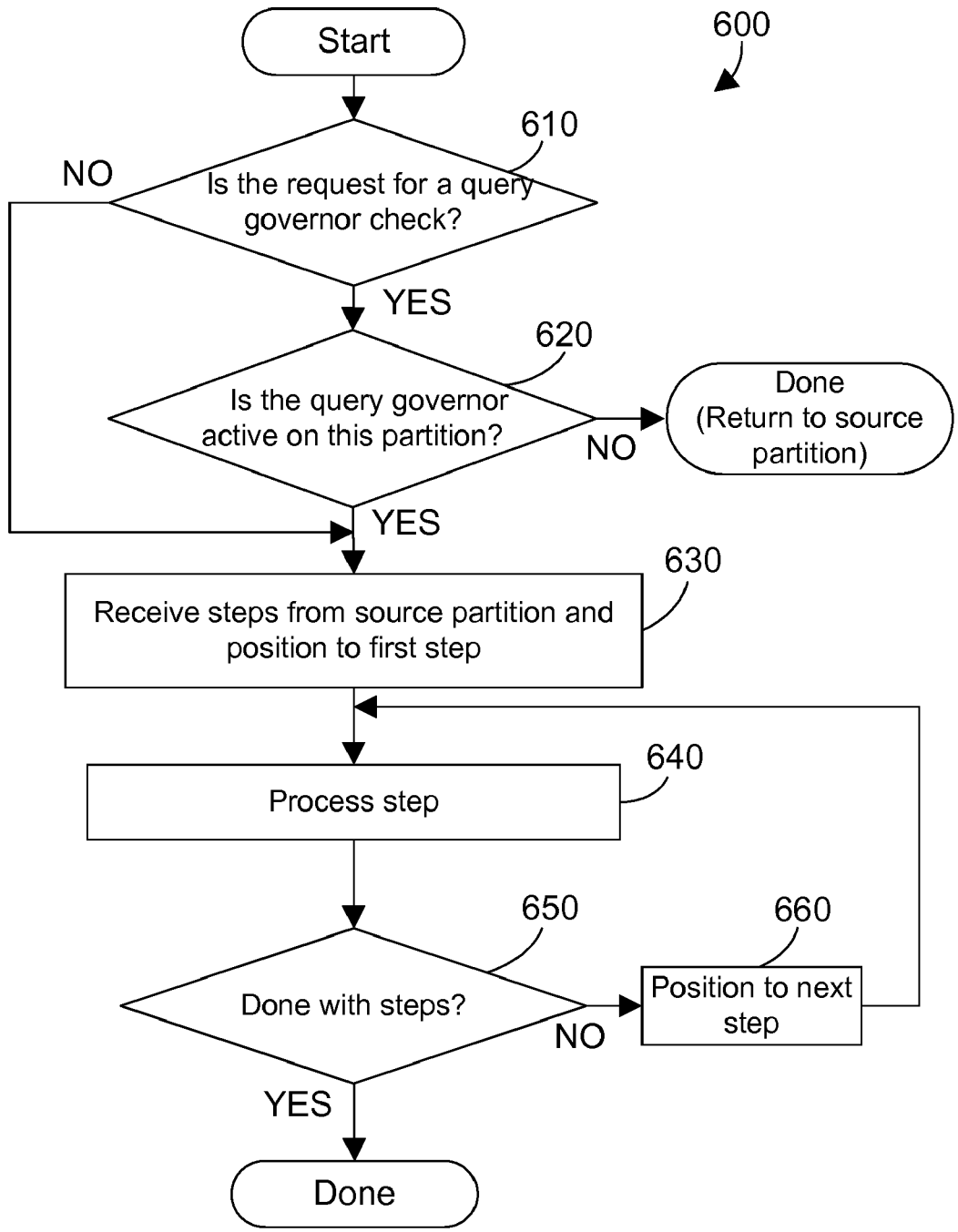
FIG. 6 is another method flow diagram for a query governor in a partitioned computer system according to a preferred embodiment.
Figure 7:
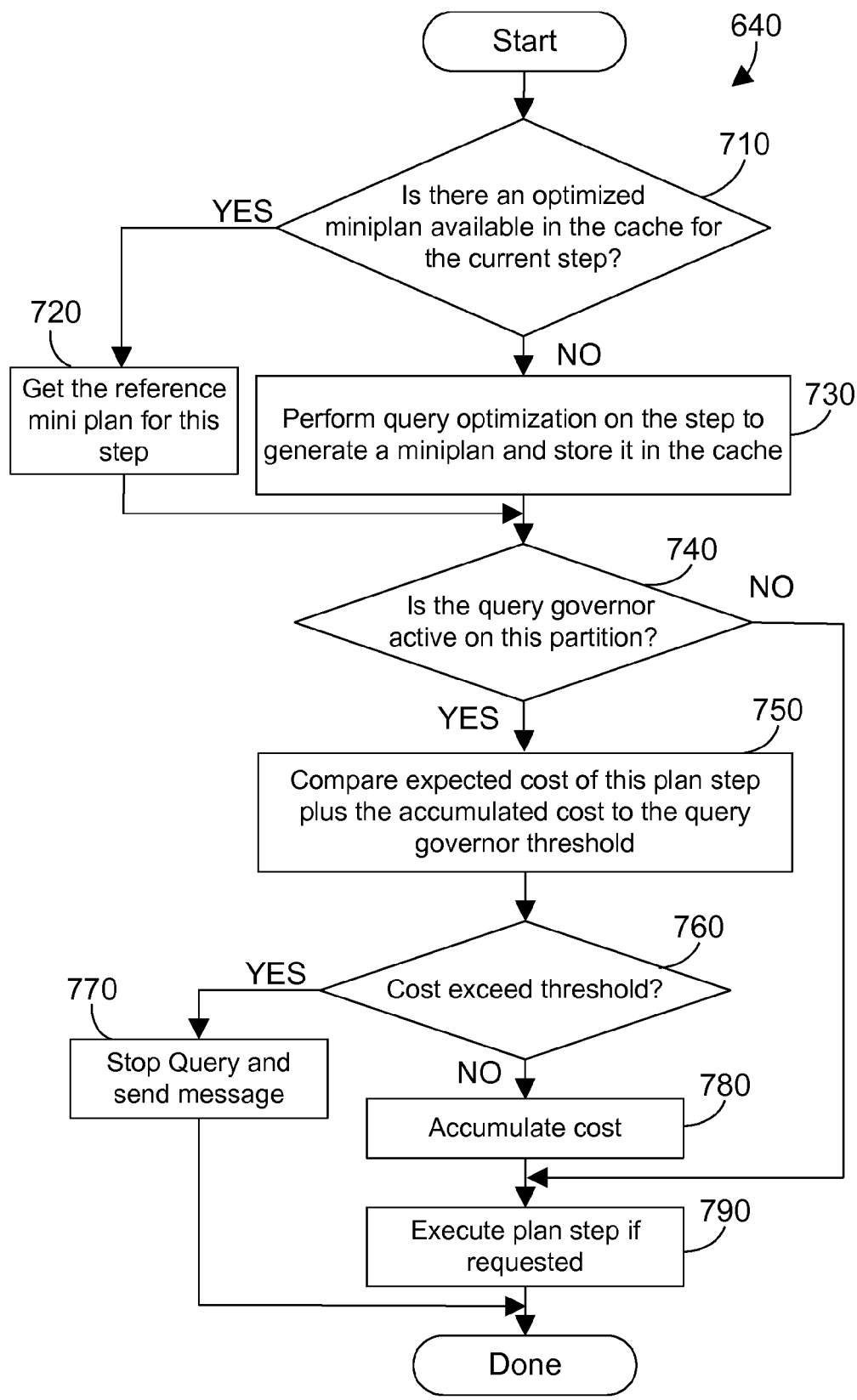
FIG. 7 is a method flow diagram that shows one suitable implementation of step 640 shown in FIG. 6.

FIGS. 4 through 7 illustrate a method for a query optimizer located on a first system to communicate with another query optimizer on another system and use global governor data according to preferred embodiments described herein. FIGS. 4 and 5 illustrate a method operating on the source system, or the system that is executing a query, where the execution of the query accesses data on the partitioned database table. FIGS. 6 and 7 illustrate the method operating on a target system that has a query optimizer that communicates with the query optimizer on the source system.

The method 400 illustrated in FIGS. 4 and 5 will now be described in more detail. This method operates on a computer system 100 described above with reference to FIG. 1. This computer system will be referred to as the source system, where it is the system that is executing a query that accesses data on a partitioned database table. The method 400 begins by parsing the query to determine which partitions are involved in the query, and then optimizes the query according to the target partitions (step 410). If the query governor is not active on the source partition (step 420=no) then skip to Flag A and continue at step 510 in FIG. 5. If the query governor is active on the source partition (step 420=yes) then position to the first step in the query processing flow (step 430). If the current step does not involves the local partition (step 440=no) then skip to step 480 to continue checking any other steps. If the current step does involves this partition (step 440=yes) then estimate the cost required to execute this step (step 445). If the estimated resource cost to execute this step exceeds a governor threshold (step 450=yes) then stop the query and send a message to the software requesting the query (step 460). If the estimated resource cost to execute this step does not exceed a governor threshold (step 450=no) then accumulate the estimated cost (step 470) and continue with step 480. If all the steps are not done (step 480=no) then position to the next step in the query processing flow (step 490) and return to step 440. If all the steps are done (step 480=yes) then go to Flag A and step 510 in FIG. 5.

The method 400 continues with the flowchart illustrated in FIG. 5 beginning at Flag A. After having estimated the resources for the source partition, now gather the steps for each partition involved in the overall plan and position to the first partition (step 510). Send the plan steps to the current target partition asking for a governor check (step 520 which is described with reference to FIGS. 6 and 7 below). A governor check is asking the governor to perform an estimate of the cost of resources to execute a query which can be done more quickly than actual execution of the query. After the governor checks (step 520), sum the estimated resource costs from the target partitions and the local partitions (step 525). If the total estimated resource costs for the steps sent to the target partition, including any resources from the source partition, exceeds a governor threshold (step 530=yes) then stop the query (step 540) and the method is done. If the estimated resource costs for the steps sent to the target partition, including any resources from the source partition, does not exceed a governor threshold (step 530=no) then go to step 550 to continue with any remainder partitions. If the partitions are not all done (step 550=no) then position to the next partition (step 560) and return to step 520. If the partitions have all been done (step 550=yes) then execute the plan (step 570) by sending the execution steps of the plan to the target partitions for execution. At this point, the method shown in FIGS. 6 and 7 is executed again on each of the target partitions asking for execution rather than a governor check.

The method 600 illustrated in FIGS. 6 and 7 will now be described in more detail. Software or hardware according to this method operates on each of the query optimizers of the partitioned computer systems as described above. This method operates when the query optimizer is executing as a target partition in response to another partition (source partition) that is requesting a query governor check or the execution of the query steps. According to method 600, first check if the request from the source optimizer is for a query governor check (step 610). If the request is not for a query governor check (step 610=no) then skip to step 630. If the request is for a query governor check (step 610=yes) then check if the query governor is active on this partition (step 620). If the query governor is not active on this partition (step 620=no) then return, the method is done. If the query governor is active on this partition (step 620=yes) then skip to step 630. In step 630, receive the steps from the source partition and position to the first step (step 630) and then process the step (step 640). The method for processing the step (step 640) is described below with reference to FIG. 7. When the step is processed (step 640 is complete), if all the steps are not done (step 650=no) then position to the next step (step 660) and return to step 640 to process the next step. If the steps are done (step 650=yes) then return, the method is complete.

FIG. 7 illustrates method 640 that processes each of the steps communicated from the source partition to the target partition. Method 640 is one suitable implementation for step 640 in FIG. 6. For method 640 in FIG. 7, first determine if there is an optimized miniplan available in the access plan cache for this step (step 710). If there is an optimized miniplan available (step 710=yes) then get the reference mini plan for this step (step 720) and go to step 740. If there is not an optimized miniplan available (step 720=no) then perform query optimization on the step to generate a miniplan and store it in the access plan cache (step 730). If the query governor is not active on this partition (step 740=no) then go to step 790. If the query governor is active on this partition (step 740=yes) then compare the expected cost of this plan step plus the accumulated cost (sum of estimated costs for previous steps) to the query governor threshold (step 750). If the accumulated cost exceeds the threshold (step 760=yes) then stop the query and send a message to the source partition (step 770). If the accumulated cost does not exceed the threshold (step 760=no) then accumulate the cost (step 780), execute the plan step if the source partition requested execution (step 790) and then return to step 650 in method 600 to process any additional steps.

An example of a query governor acting upon a sample SQL query will now be described according to preferred embodiments herein. The example will be described with reference to the following SQL query:

SELECT STORE.REGION, SUM(SALES.PRICE) FROM STORE, SALES WHERE STORE.STOREKEY=SALES.STOREKEY GROUP BY STORE.REGION

This example assumes the tables STORE and SALES are both partitioned tables whose partition key is STOREKEY. For simplicity there are only two partitions, P1 and P2. Since REGION is not a partition key, some intermediate results must be sent back to the originating partition for final computation. This example uses the global thresholds described above as follows: TOTAL_RUNTIME_THRESHOLD, and TOTAL_TEMPORARY_STORAGE_THRESHOLD.

In this example, P1 is the initiating partition (the one receiving the query request). The query governor on the P1 partition processes the above SQL statement (step 410), noticing the tables are partitioned and that the join is along the partition key (STOREKEY). It also notices the grouping must be finished in a final step. It breaks the query down into the following query steps (See method 400 in FIG. 4 and the description above):

Step 1. perform the join and initial grouping on each partition

Step 2. send the results back to the originating partition

Step 3. perform final grouping

Applying the above 3 steps to the example query is as follows:

Step 1: Part A—Target partition

Flow the following query to P2—SELECT STORE.REGION, SUM(SALES.PRICE) SUMSALES FROM STORE, SALES WHERE STORE.STOREKEY=SALES.STOREKEYGROUP BY STORE.REGION Step 1: Part B—Local partition Initiate the following query locally (P1)—SELECT STORE.REGION, SUM(SALES.PRICE) SUMSALES FROM STORE, SALES WHERE STORE.STOREKEY=SALES.STOREKEYGROUP BY STORE.REGION Step 2: Flow P2 results back to P1

Step 3: Initiate the following grouping query locally (P1)—
SELECT STORE.REGION, SUM(SUMSALES) FROM (Step1B results unioned with Step 2 results).

Now that the steps of the query are determined, the example continues by following the flow diagram (method 400). Since the query governor is active on the partition (step 420=yes), position to the first step (step 430). The step involves the local partition (step 440=yes) so estimate the cost required to execute this step (step 445). The sample governor determines if the estimated resource cost exceeds the governor threshold (step 450). This step is repeated for each of the threshold values described above. We assume the estimated resource cost does not exceed the governor threshold (step 450=no) so we accumulate the cost and position to the next step (step 490). Since step 2 does not involve this partition (step 440) and we are done with all the steps (step 480) we gather steps for each partition in the overall plan and position to the first partition (step 510), in this case partition P2. Steps 1B and 2 are sent to partition P2 for governor checks (step 520). P2 runs through method 600 (steps 610-780). Back on partition P1, at step 530, the accumulating governor values are also checked (at P1). Assuming the query steps pass the governor checks (step 530=no), the partitions are done (step 550) then complete the running of the query (step 570).

As described above, embodiments provide a method and apparatus for a multi partition query governor in partitioned computer systems. In preferred embodiments a query governor file is provided that is associated with multiple partitions and determines how the query governor file manages the database across multiple partitions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer apparatus comprising:
    a first computer system comprising:
        at least one processor;
        a memory coupled to the at least one processor;
        a query governor file having global governor data where the global governor data includes a plurality of global governor thresholds for resource costs to execute a query, wherein the resource costs comprise at least one of the following: total run time of the query, total temporary storage, hard drive activity, and central processing unit cycles;
        a first query governor residing in the memory and executed by the at least one processor wherein the first query governor estimates a resource cost to execute the query on the first computer system;
    a database with a partitioned table located on a plurality of partitions;
    a second query governor on a second computer system associated with a target partition that is one of the plurality of partitions wherein the second query governor estimates a resource cost to execute the query on the second computer system;
    a communication mechanism between the first and second query governor;
    wherein the second query governor communicates the estimated resource cost to execute the query on the second computer system to the first query governor and wherein the first query governor determines a total cost by adding the estimated resource costs to execute the query on the first computer system and the estimated cost to execute the query on the second computer system, and
    wherein the first query governor determines whether the total cost to execute the query on the plurality of partitions exceeds a global governor threshold of the plurality of global governor thresholds, and allows access to the partitioned table when the total cost to execute the query on the plurality of partitions does not exceed the global governor threshold.

2. The computer apparatus of claim 1 wherein the plurality of global governor thresholds are selected from the following: total run time of the query, total temporary storage, hard drive activity, and central processing unit cycles.

3. The computer apparatus of claim 1 wherein the global governor data includes global governor thresholds for the total resource cost to access at least two but less than all the plurality of partitions.

4. A networked computer system comprising:
    a first computer system with a first partition of a partitioned database table and a first query governor that estimates a resource cost to execute a query on the first partition;
    a second computer system coupled to the first computer system, the second computer system comprising a second partition of the partitioned database table and a second query governor that estimates a resource cost to execute the query on the second partition;
    a query governor file associated with the database having global governor data, where the global governor data provides governor data to access the first and second partitions, wherein the global governor data includes a plurality of global governor thresholds for the total resource costs to execute a query on the partitioned table on the plurality of partitions, wherein the resource costs comprise at least one of the following: total run time of the query, total temporary storage, hard drive activity, and central processing unit cycles;
    wherein the second query governor communicates the estimated resource cost to execute the query on the second partition to the first query governor;
    wherein the first query governor determines a total cost from the estimated cost to execute the query on the first partition summed with the estimated cost to execute the query on the second partition; and
    wherein the first query governor determines whether the total cost to execute the query on the plurality of partitions exceeds a global governor threshold of the plurality of global governor thresholds, and allows access to the partitioned table when the total cost to execute the query on the plurality of partitions does not exceed the global governor threshold.

5. The networked computer system of claim 4 wherein plurality of global governor thresholds are selected from the following: total run time of the query, total temporary storage, hard drive activity, and central processing unit cycles.

6. A computer-readable program product comprising:
    a first query governor that estimates a resource cost to execute a query on a first partition of a plurality of partitions;
    a second query governor that estimates a resource cost to execute the query on a second partition of the plurality of partitions;
    a query governor file associated with a database having a partitioned table located on the plurality of partitions, the database having global governor data, where the global governor data provides governor data to access the first and second partitions, wherein the global governor data includes a plurality of global governor thresholds for resource costs to execute a query on the partitioned table on the plurality of partitions, wherein the resource costs comprise at least one of the following: total run time of the query, total temporary storage, hard drive activity, and central processing unit cycles;

wherein the second query governor communicates the estimated resource cost to execute the query on the first partition to the first query governor;

wherein the first query governor determines the total cost to execute the query from the estimated cost to executed the query on the first partition summed with the estimated cost to execute the query on the second partition;

wherein the first query governor determines whether the total cost to execute the query on the plurality of partitions exceeds a global governor threshold of the plurality of global governor thresholds, and allows access to the database on the plurality of partitions when the total cost to execute the query on the plurality of partitions does not exceed the global governor threshold; and non-transistory recordable media bearing the first and second query governor.

7. The program product of claim 6 wherein the global governor data includes global governor thresholds for the total resource cost to access at least two but less than all the plurality of partitions.

8. The program product of claim 6 wherein the plurality of global governor thresholds are selected from the following: total run time of the query, and total temporary storage.

* * * * *